J. W. Bradley,
Washing Machine,
N° 64,276. Patented Apr. 30, 1867.
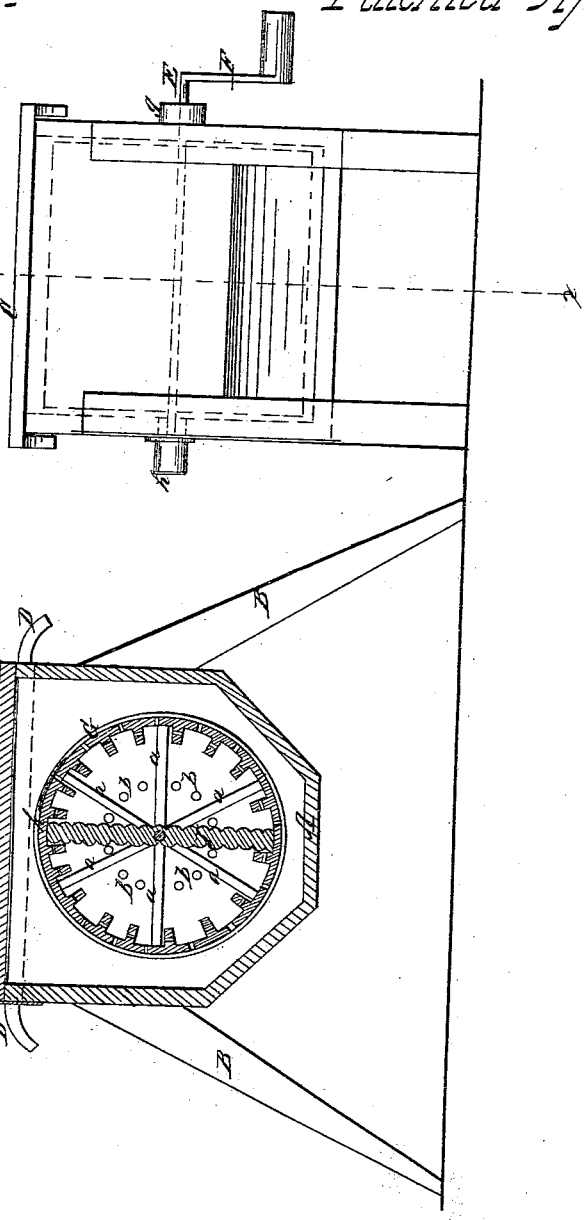
Witnesses
Theo Tusche
W<sup>m</sup> Trewm
Inventor:
Jos. W. Bradley
Per Munn & Co
Attorneys.

United States Patent Office.

JOSEPH W. BRADLEY, OF ROCHEPORT, MISSOURI.

Letters Patent No. 64,276, dated April 30, 1867.

---

IMPROVED WASHING MACHINE.

---

The Schedule referred to in these Letters Patent and making part of the same.

---

TO ALL WHOM IT MAY CONCERN:

Be it known that I, JOSEPH W. BRADLEY, of Rocheport, in the county of Boone, and State of Missouri, have invented a new and useful Improvement in Washing Machines; and I do hereby declare that the following is a full, clear, and exact description thereof, which will enable those skilled in the art to make and use the same, reference being had to the accompanying drawings, forming part of this specification.

My invention consists in constructing a cylinder in a peculiar manner, which cylinder is revolved in a suitable box, and into which the clothes are placed to be washed.

Figure 1 represents a vertical section of the cylinder and box through the line $x$ $x$ of fig. 2.

Figure 2 is a side or front elevation of the machine, showing the shaft and cylinder in dotted lines.

Similar letters of reference indicate corresponding parts.

A represents the box, which is supported on legs B. The lower portion of A is octagonal in shape, as seen in the drawing. C represents the cover, and D the handles. E is a shaft which passes through the box, and which is revolved by the crank F in the boxes $h$ $g$. These boxes are attached to the sides of the box, as seen in fig. 2. G represents the cylinder, which is attached to the shaft E, either permanently or so that the shaft may be withdrawn when desired. The cylinder is covered with T-shaped slats placed a short distance apart, as seen in the drawing. $a$ represents projecting ribs upon the inside of the cylinder-heads. $b$ represents holes through the heads. J is a partition in the cylinder dividing it into two compartments. This partition is grooved or corrugated, and forms a wash-board on each side, with numerous perforations for the passage of water. $k$ is a door into the cylinder, which shuts over the partition, thereby giving access to both compartments for admitting and removing the clothes. A sufficient supply of water is placed in the box and the cylinder is revolved with the clothes. The water flows freely into the cylinder and among the clothes, and the agitation of the clothes in this manner over the uneven surfaces soon cleanses them.

Having thus described my invention, what I claim as new, and desire to secure by Letters Patent, is—

The cylinder G, consisting of the T-shaped slats placed a short distance apart around its periphery, projecting ribs $a$ upon the inside of the perforated cylinder-heads, grooved or corrugated partition J, and door $k$, as herein set forth for the purpose specified.

JOSEPH W. BRADLEY.

Witnesses:
    R. W. HUBBARD,
    JOHN KEYSER.